United States Patent
Chen et al.

(10) Patent No.: US 11,188,810 B2
(45) Date of Patent: Nov. 30, 2021

(54) INTEGRATED ASSISTANCE PLATFORM

(71) Applicant: AT&T Intellectual Property I, L.P, Atlanta, GA (US)

(72) Inventors: Chuxin Chen, San Francisco, CA (US); George Dome, Tinton Falls, NJ (US); John Oetting, Zionsville, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 769 days.

(21) Appl. No.: 16/018,772

(22) Filed: Jun. 26, 2018

(65) Prior Publication Data

US 2019/0392286 A1 Dec. 26, 2019

(51) Int. Cl.
| | |
|---|---|
| *G06N 5/04* | (2006.01) |
| *G06N 3/00* | (2006.01) |
| *G06N 20/00* | (2019.01) |
| *G06N 3/08* | (2006.01) |

(52) U.S. Cl.
CPC ............. *G06N 3/006* (2013.01); *G06N 5/043* (2013.01); *G06N 20/00* (2019.01); *G06N 3/088* (2013.01)

(58) Field of Classification Search
CPC ..................................................... G06N 5/043
See application file for complete search history.

(56) References Cited

U.S. PATENT DOCUMENTS

| | | | |
|---|---|---|---|
| 8,195,333 | B2 | 6/2012 | Ziegler et al. |
| 8,359,122 | B2 | 1/2013 | Koselka et al. |
| 8,406,926 | B1 | 3/2013 | Lewis |
| 9,375,845 | B1 | 6/2016 | Annan et al. |
| 9,452,525 | B2 | 9/2016 | Ziegler et al. |
| 9,724,824 | B1 | 8/2017 | Annan et al. |
| 2002/0128746 | A1 | 9/2002 | Boies et al. |
| 2013/0158368 | A1* | 6/2013 | Pacione ................. A61B 5/318 600/301 |

(Continued)

FOREIGN PATENT DOCUMENTS

| | | |
|---|---|---|
| CN | 101087395 | 12/2010 |
| CN | 103876838 | 6/2014 |

(Continued)

OTHER PUBLICATIONS

Bonaccorsi et al., "A cloud robotics solution to improve social assistive robots for active and healthy aging", International Journal of Social Robotics 8.3 (2016), 16 pages.

(Continued)

*Primary Examiner* — Hal Schnee
(74) *Attorney, Agent, or Firm* — Guntin & Gust, PLC; Dana Lemoine

(57) ABSTRACT

Systems and methods disclosed herein relate to autonomous agents. A first autonomous agent receives, from a first sensor, a first set of event data indicating events relating to a subject. The first autonomous agent provides the first set of event data to a data aggregator. The first autonomous agent receives, from the data aggregator, correlated event data including events sensed by the first autonomous agent and a second autonomous agent. The first autonomous agent applies machine learning model to the correlated event data to predict a first pattern of activity and determines, based on the first pattern of activity, that a first action is to be performed, causing the first actuator module to perform the first action.

20 Claims, 6 Drawing Sheets

(56) References Cited

U.S. PATENT DOCUMENTS

| | | | |
|---|---|---|---|
| 2014/0125678 | A1 | 5/2014 | Wang et al. |
| 2014/0277735 | A1 | 9/2014 | Breazeal |
| 2015/0278676 | A1 | 10/2015 | Miao et al. |
| 2015/0294595 | A1 | 10/2015 | Hu et al. |
| 2015/0309490 | A1* | 10/2015 | Patel ............ G06N 20/00 700/49 |
| 2016/0199977 | A1 | 7/2016 | Breazeal |
| 2016/0314185 | A1 | 10/2016 | Buchanan et al. |
| 2016/0379107 | A1 | 12/2016 | Li et al. |
| 2016/0379121 | A1 | 12/2016 | Ge et al. |
| 2017/0039344 | A1 | 2/2017 | Bitran et al. |
| 2017/0206064 | A1 | 7/2017 | Breazeal et al. |
| 2017/0228520 | A1 | 8/2017 | Kidd et al. |
| 2018/0322413 | A1* | 11/2018 | Yocam ............ G07C 5/085 |

FOREIGN PATENT DOCUMENTS

| | | |
|---|---|---|
| CN | 104618464 | 5/2015 |
| CN | 105137828 | 12/2015 |
| JP | 2016101441 | 6/2016 |
| KR | 20120061688 | 6/2012 |
| KR | 101330046 | 11/2013 |
| KR | 20170022717 | 3/2017 |
| WO | 2015158017 | 10/2015 |
| WO | 2015172445 | 11/2015 |
| WO | 2018020275 | 2/2018 |

OTHER PUBLICATIONS

Geiger, "The Robot ALIAS as a Gaming Platform for Elderly Persons", Deutscher AAL-Kongress 22-23, Jan. 2013, 7 pgs.

Pettit, "Scientists create an AI robot CAT that helps keep the elderly company and reminds them to take their medication", Daily Mail, dailymail.co.uk, Dec. 12, 2017; 27 pgs.

Pollack, "A mobile robotic assistant for the elderly." AAAI workshop on automation as eldercare. vol. 2002. 2002, https://www.researchgate.net/publication/2494731_Pearl_A_Mobile_Robotic_Assistant_for_the_Elderly; 20 pages.

Woolsey, "Fairfax startup creates robot for in-home senior care", http://www.fairfaxtimes.com/articles/fairfax-startup-creates-robot-for-in-home-senior-care/article_eeb36f42-bb57-11e7-b789-bf127ea148db.html, Oct. 27, 2017; 3 pgs.

Matuszek, The Conversation, "How robots could help bridge the elder-care gap", available at http://theconversation.com/how-robots-could-help-bridge-the-elder-care-gap-82125, Aug. 17, 2017, 4 pgs.

ElliQ robot described at https://www.intuitionrobotics.com/elliq, Jan. 23, 2019, 4pgs.

Guizzo, IEEE Spectrum article "Robosoft Unveils Kompai Robot to Assist Elderly, Disabled" Jan. 9, 2010, 2 pgs.

Borenstein and Pearson, "Robot caregivers: harbingers of expanded freedom for all?," J. Ethics Inf. Tech (Jul. 2, 2010), available at https://personalrobotics.ri.cmu.edu/files/courses/16867/readings/Borensteinrobot_caregivers.pdf, 12 pgs.

Tarantola, Robot caregivers are saving the elderly from the lives of loneliness, (Aug. 29, 2017), 5 pgs.

* cited by examiner

INTEGRATED ASSISTANCE PLATFORM

TECHNICAL FIELD

This invention relates generally to automatic assistance devices and more specifically to an integrated assistance platform that integrates data from disparate sources and uses machine-learning to provide intelligent assistance.

BACKGROUND

Smart devices provide many benefits. Smart devices can receive voice commands and integrate with home appliances and internet services, making daily living easier. For example, smart devices can turn on or off home appliances or provide news updates via a display or text-to-speech.

But such devices do not fully address the specific needs of seniors. For example, some senior-specific devices exist, but such devices fail to fully address senior-specific needs such as mental health issues like dementia, physical mobility issues, or loneliness. More specifically, existing solutions do not fully integrate disparate systems such as local sensors with Internet-based services with artificial intelligence. As such, existing systems are not able to proactively address the needs of seniors. Hence, additional solutions are needed.

SUMMARY

Certain aspects and features include a system and a method of operating a first autonomous agent, a second autonomous agent, and a data aggregator. The first autonomous agent includes a first sensor module, a first reasoning module, and a first actuator module. The first sensor module manages a first sensor and the first reasoning module provides a first machine learning model. The first autonomous agent is configured to receive, from the first sensor module, a first set of event data indicating events relating to a subject, provide the first set of event data to a data aggregator and receive, from the data aggregator, correlated event data including events sensed by the first autonomous agent and the second autonomous agent. Updating the first machine learning model includes applying the machine learning model to the correlated event data to predict a first pattern of activity, determining a first reward of the first machine learning model, and updating internal parameters of the first machine learning model to maximize the first reward. The first autonomous agent is further configured to determine, via the first reasoning module and based on the first pattern of activity, that a first action is to be performed, causing the first actuator module to perform the first action.

The second autonomous agent includes a second sensor module, a second reasoning module, and a second actuator module. The second sensor module manages a second sensor and the second reasoning module provides a second machine learning model. The second sensor is different from the first sensor and the second autonomous agent is configured to receive, from the second sensor module, a second set of event data indicating events relating to a subject, provide the second set of event data to the data aggregator, receive, from the data aggregator, the correlated event data, and update the second machine learning model. Updating the second machine learning model includes applying the second machine learning model to the correlated event data to predict a second pattern of activity, determining a second reward of the second machine learning model, and updating internal parameters of the second machine learning model to maximize the second reward. The second autonomous agent is configured to determine, via the second reasoning module and based on the second pattern of activity, that a second action is to be performed and cause the second actuator module to perform the second action.

The data aggregator includes a data store and is configured to store the first set of event data and the second set of event data in the data store, correlate event data from the first set of event data and the second set of event data, and store the correlated event data in the data store.

These illustrative examples are mentioned not to limit or define the disclosure, but to provide examples to aid understanding thereof. Additional examples and further description are provided in the Detailed Description.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
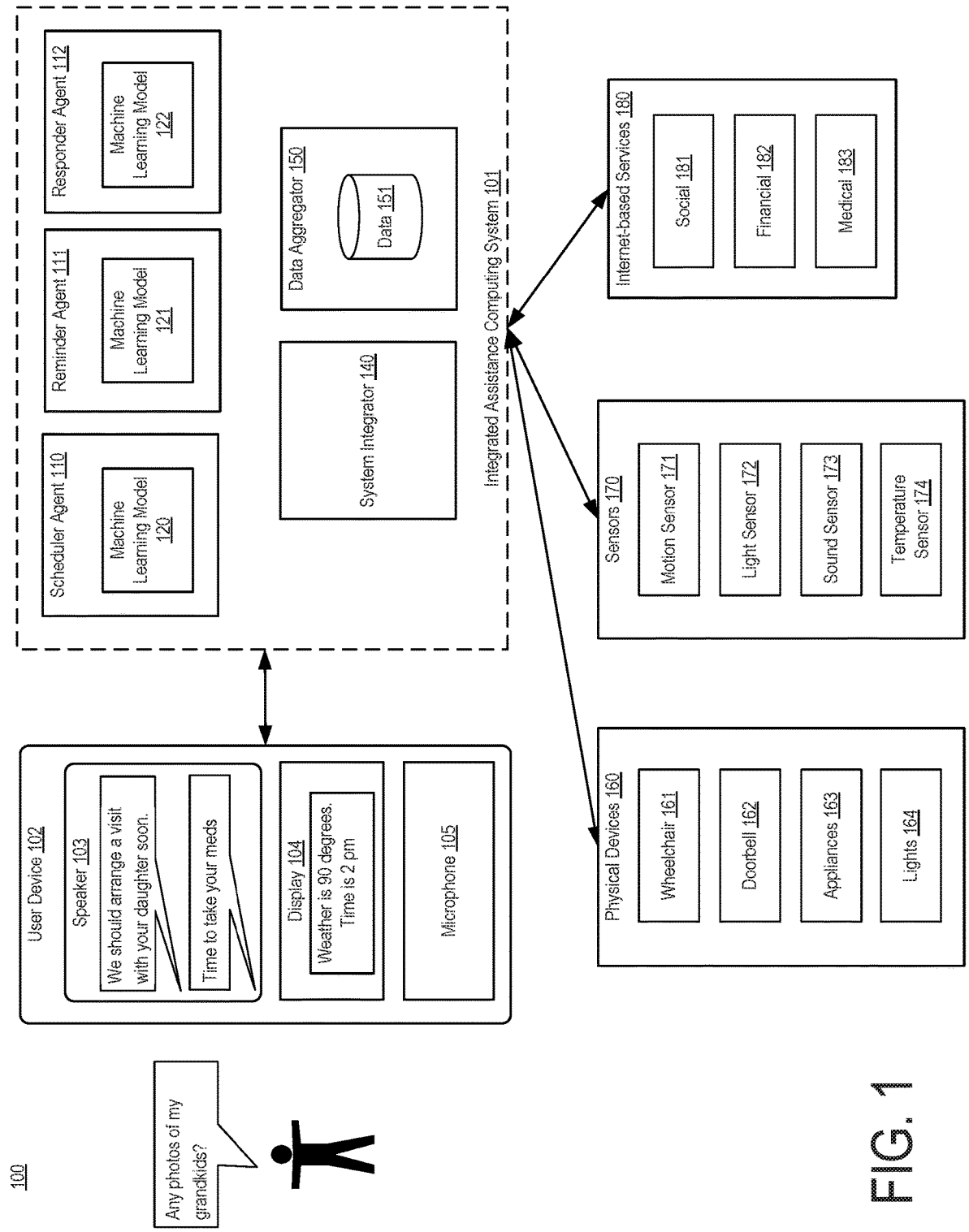
FIG. 1 illustrates an exemplary integrated assistance computing system, according to certain aspects of the present disclosure.

Aspects of the present invention relate to an integrated assistance computing platform that assists users in a proactive manner with daily living. The integrated assistance computing platform can address the needs of seniors or other people. The integrated assistance platform can be implemented as smartphone application connecting to a cloud-based service, a hardware device, or a robotic device. The integrated assistance computing system includes one or more autonomous agents. Autonomous agents are applications or devices that execute independently from each other, each with separate machine learning capability configured to process sensor data from themselves or other autonomous agents, determine that a specific action should be performed based on correlated event data, and cause the action to be performed.

Each autonomous agent uses one or more machine learning models that use unsupervised, supervised, or reinforcement learning. In this manner, the agents are self-improving and can therefore become more valuable to a user. By using an integrated assistance computing platform, each autonomous agent gathers and takes decisions based on data from other agents, sensors, and disparate sources such as external databases or internet services such as medical systems, financial systems, and social media.

Exemplary autonomous agents include scheduler, reminder, and responder agents, but other types of autonomous agents are possible. For example, a scheduler agent proactively schedules appointments with medical or financial professionals, or coordinates social activity. Appointments can be scheduled based on predictions from machine-learning models based on aggregated data from disparate sources such as medical or financial records. For example, a reminder agent reminds the user, by activating an alert such as a sound, light, or phone call, that an appointment is approaching. An responder agent monitors or control household appliances and sensors. The responder agent responds to a user request using a voice assistant. The responder agent accesses Internet sites such as personal financial or medical sites. The responder agent interacts with the user in order to inform the user of daily events, schedule appointments, converse with the user, or provide the user with puzzles or brain-teasers.

The following example is provided to introduce certain aspects. A first autonomous agent including a sensor module, a reasoning module, and an actuator module operates on an integrated assistance computing system. The sensor module of the first autonomous agent connects to a door sensor and a light sensor, thereby receiving event data indicating when a door has been opened and closed and when a light has been turned on or off. The first autonomous agent provides the event data to a data aggregator operating on the platform.

A second autonomous agent also operates on the integrated assistance computing platform. The second autonomous agent includes a reasoning module that connects to various Internet-based services in order to obtain emails, weather forecasts, expected sunrise and sunset. The data aggregator receives event data from a second autonomous agent. The event data includes the weather, sunrise time, and sunset time. The second autonomous agent provides the events to the data aggregator. Over time, the data aggregator correlates door-related events and light-related events.

Continuing the example, the first autonomous agent receives correlated events from the data aggregator and updates the machine learning model of the first autonomous agent. The machine learning model analyzes the data, learn patterns, or makes predictions on the correlated data. Continuing the example, the machine learning model recognizes a daily pattern that includes the light being turned and a door being opened shortly after sunrise. The first autonomous agents creates a rule based on this predicted pattern. At a future time, if the door and light sensors do not detect events based on this rule, then the first autonomous agent creates an alert. Deviation from patterns can be detected and exceptions can be made. For example, if an autonomous agent detects that the user stayed up late the previous day, then the rule can be varied slightly to allow for the fact that the user will likely sleep in.

In another example, a machine learning model detects a pattern of a user watching particular baseball games. Detecting this event data can be performed using audio or video recognition or interfacing with a television or cable box. The autonomous agent can also access Internet-based services to obtain event data including wins and losses for the team, delayed game starts, overtimes, etc. The data aggregator aggregates this event data from disparate sources and provides the data to the autonomous agent. This aggregated data is useful in performing several different functions. For example, a responder agent can send alerts to the user with game scores or announce that the game will start late. Further, by analyzing this data using the machine learning model, the autonomous agent determines additional trends such as a particular losing streak.

The autonomous agent inputs the aggregated event data to a machine learning model, which recognizes a pattern. Examples of patterns include that the user typically watches all games for a particular team, all away games, games on a Saturday, or a majority of games. Predictions can also be based on external data such as the weather or other scheduled activities. Based on the determined pattern, the autonomous agent can predict whether a user will watch a particular game. Based on this prediction, the autonomous agent can automatically turn the television on, or remind the user that the game will be on that day.

Additionally, the autonomous agent can use the predictions to determine that an abnormal activity has occurred and can then act accordingly. For example, if the autonomous agent predicts that the user will watch a particular game, but does not watch the game, the responder agent takes an action such as reminding the user with an audio or visual alert.

In some circumstances, missing a game can cause an autonomous agent to issue an alert. But the autonomous agent first checks to determine whether another explanation exists for the user missing the game. The autonomous agent checks sensor event data to determine whether the user is performing another activity as detected by appliance, light, sound, or other events. In this case, the autonomous agent might determine that the user is healthy and is simply busy doing something else. Similarly, data from Internet-sources such as emails or social media may indicate appointments or visits are scheduled at the same time as the game. For example, the user's daughter could be visiting.

Having determined an exception to a predicted event, the autonomous agent then learns from the deviation, using reinforcement or other machine learning techniques. For example, the autonomous agent learns that the user does not watch baseball games when the user's daughter is visiting. The autonomous agent provides this feedback to the machine learning model and the data aggregator. The machine learning model is updated accordingly and next time the user does not watch a predicted game and the daughter is visiting, the autonomous agent does not identify a deviation. In this manner, by analyzing events from disparate sources, an autonomous agent determines a richer understanding of user behavior and improves over time.

Alternatively, responsive to determining that no other events indicate a reason that the user missed a game, the autonomous agent takes an action. A responder agent can first attempt to reach the user by alert, and if the user does not respond, then the responder agent attempts to reach the user or can send an alert to family or friends.

Other learned predictions can include predicting a time to get a cane, move from cane to a walker, and move from walker to wheelchair. Via actuator modules, the autonomous agents can also schedule activities and services such as scheduling transportation for medical and physical therapy, or physician visits. Autonomous agents can also send alerts that include when to take pills and shots or alert a care-giver of possible forgetfulness, or email grocery lists.

Turning now to the Figures, FIG. 1 illustrates an exemplary integrated assistance computing platform 100, according to certain aspects of the present disclosure. Integrated assistance computing platform 100 includes integrated assistance computing system 101, user device 102, physical devices 160, sensors 170, and Internet-based services 180. Integrated assistance computing system 101 can be implemented as a mobile application on a phone or tablet, on a personal computer such as a laptop or desktop, or implemented in a physical robot. Integrated assistance computing system 101 can access physical devices 160, sensors 170, or Internet-based services 180 via a network or other connection.

User device 102 provides a point of interaction for the user. User device 102 includes speaker 103, display 104, and microphone 105. Speaker 103 can be used by integrated assistance computing system 101 to transmit audio or speech to a user. Display 104 can display information such as status updates, news, weather, or alerts. For example, as depicted, display 104 is displaying the weather and the time. Microphone 105 can receive voice commands from a user. Integrated assistance computing system 101 can process the commands or use an external system to process commands and respond.

In response to decisions taken by autonomous agents 110-112, system integrator 140 can reconfigure, activate, or deactivate one or more physical devices 160. Physical devices 160 include wheelchair 161, doorbell 162, appliances 163, and lights 164. For example, system integrator 140 can cause wheelchair 161 to move. System integrator 140 can receive a notification from doorbell 162 or access images from a camera installed on doorbell 162. System integrator can turn on or turn off appliances 163. Appliances 163 can include microwaves, stoves, refrigerators, and the like. System integrator 140 can turn on, turn off, or dim lights 164. Integrated assistance computing system 101 can connect to physical devices 160 via dedicated point-to-point connection, a wired connection, or a wireless connection. In an aspect, physical devices 160 can be operated by a smart home system connected to integrated assistance computing system 101 via a network connection. Other physical devices are possible such as medical alert systems, self-driving cars, or robots. For example, system integrator can cause a robot to approach a user.

Sensors 170 include motion sensor 171, light sensor 172, sound sensor 173, and temperature sensor 174. Other sensors are possible. Sensors 170 provide autonomous agents 110-112 data or events on which to base decisions and take actions. For example, sound sensor 173 provides a signal to responder agent 112 that indicates that the user has made a specific sound that identifies that the user is awake. Such sounds and their identification can be provided or learned. Temperature sensor 174 provides a signal to responder agent 112 that a residence is too hot or too cold.

Internet-based services 180 include public services and also services that store or maintain personally identifiable information. For example, Internet-based services include social services 181 such as social media accounts, financial services 182 such as bank accounts or investment accounts, and medical services 183 such as doctors, dentists, wellness centers, or medical alert systems. By connecting to Internet-based services 180, integrated assistance computing system 101 can remind the user of upcoming appointments, changes that may need to be made to investment plans or medical accounts, identify potential fraud, etc.

Integrated assistance computing system 101 includes one or more autonomous agents such as a scheduler agent 110, reminder agent 111, or responder agent 112. Scheduler agent 110 performs scheduling functions such as making medical appointments, making appointments with financial advisors, or scheduling social activities. Reminder agent 111 creates alerts such as reminding the user to take his or her medication, to alter an investment plan, or send emails to friends and family. Responder agent 112 can respond to commands such as verbal commands received via microphone 105 or commands received via a user interface. Responder agent 112 can also play interactive games such as puzzles with a user. Responder agent 112 can also activate or deactivate physical devices 160.

While three autonomous agents 110-112 are depicted, additional autonomous agents are possible. Autonomous agents can be added to the integrated assistance computing platform via software upgrades, or implemented on remote computing systems and accessed via a data network.

Integrated assistance computing system 101 also includes system integrator 140, which can receive information from or control physical devices 160, sensors 170, or Internet-based services 180. Using system integrator 140, autonomous agents 110-112 can control external devices. For example, if the responder agent 112 decides that the lights 164 should be turned on as light sensor 172 is receiving a signal that a light level is too dim, then responder agent 112 can send a control signal to system integrator 140, which in turn causes the lights 164 to be activated. System integrator 140 can perform speech recognition.

Data aggregator 150 aggregates data from one or more autonomous agents 110-112. Data aggregator includes one or more data stores 151. Data aggregator 150 can perform data functions such as correlation. For example, if data aggregator 150 determines that event data received from scheduler agent 110, for example, an appointment, is related to data received from reminder agent 111, then data aggregator can integrate the data into a common data entry or data structure, or link the data together by using a reference. In this manner, autonomous agents 110-112 receive the benefit of utilizing correlated data aggregated from multiple autonomous agents.

For example, each autonomous agent 110-112 can access correlated data from data aggregator 150, which in turn accesses data from physical devices 160, sensors 170, or Internet-based services 180, and take actions based on that data. For example, scheduler agent 110 can determine from a medical service 183 that a user has a doctor's appointment. Scheduler agent 110 can provide this information to machine learning model 120, which, over multiple iterations, can learn the frequency with which medical appointments are scheduled. Scheduler agent 110 can remind the user, for example, by sending a message to speaker 103 or display 104, that an upcoming appointment, or, if no appointment is scheduled, cause an appointment to be scheduled.

Each autonomous agent 110-112 can also access data gathered from other autonomous agents, provide that data to a machine learning model, and receive predictions thereon. For example, an autonomous agent 110-112 can access correlated data from data aggregator 150, provide the data to one or more machine learning models, and receive predictions from the machine learning model. Each autonomous agent can receive event data from sensors 170, provide the event data to data aggregator 150, receive correlated event data from data aggregator 150, provide the event data to a machine learning model, receive a prediction from the machine learning model and take action based on the decision. As depicted, scheduler agent 110 includes machine learning model 120, reminder agent 111 includes machine learning model 121, and responder agent 112 includes machine learning model 122. The methods used with machine learning models in each agent are discussed further with respect to FIG. 2.

Figure 2:
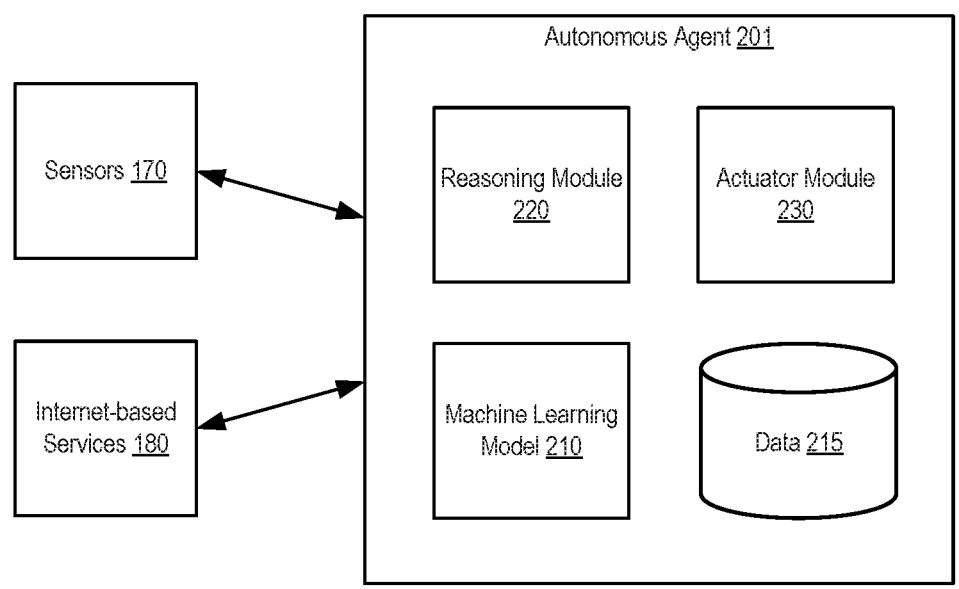
FIG. 2 illustrates an exemplary environment in which an autonomous agent can operate, according to certain aspects of the present disclosure.

FIG. 2 illustrates an exemplary environment in which an autonomous agent can operate, according to certain aspects of the present disclosure. Environment 200 includes autonomous agent 201, sensors 170, and Internet-based services 180. Autonomous agent 201 includes one or more of reasoning module 220, actuator module 230, machine learning model 210, and data 215. Each autonomous agent can execute as a separate application on integrated assistance computing system 101, or on a separate computing system. Reasoning module 220, actuator module 230, and machine learning model 210 can execute on integrated assistance computing system 101 as separate applications or processes, or can execute on different processors. Data 215 can be used for local storage or storage of training data used for machine learning model 210. In an aspect, machine learning model 210 can be included within reasoning module 220.

Autonomous agents can help combat senior-specific problems such as loneliness and dementia. For example, by analyzing data from multiple agents, integrated assistance computing platform can detect whether anyone has been seen at a residence or whether the user has interacted with anyone. Integrated assistance computing platform can help combat dementia by playing games and puzzles with the user. The games and puzzles can be obtained from Internet-based services 180. By integrating data from different autonomous agents and other sources, the scheduler agent and the reminder agent can perform more sophisticated analysis than with one agent alone, can make more intelligent suggestions, and be more useful to the user. For example, if an event indicates that the user is watching television more than usual or not moving much is correlated with not taking their medication on time, the autonomous agent may conclude that the user is not feeling well and take an action.

Autonomous agents can self-organize and self-register with the integrated assistance computing platform. In an aspect, the autonomous agents can use an auto-discovery function provided by integrated assistance computing system 101. The auto-discovery function periodically checks for new autonomous agents, physical devices 160, sensors 170, or Internet-based services 180. If a new agent, device, sensor, or service is detected, then the auto-discovery function updates internal configuration tables, configures interface protocols, refreshes a network topology, and activates the new agent, device, sensor, or service. In an example, a new autonomous agent is added to the integrated assistance computing system 101. The new autonomous agent communicates its capabilities to the computing system. In turn, the computing system informs other autonomous agents of the capabilities. The platform starts providing information to the agent, for example, via data aggregator 150.

Autonomous agent 201 accesses physical devices 160, sensors 170, and Internet-based services 180. For example, a first autonomous agent can analyze sensors in a residence such as light sensor 172 or sound sensor 173. Simultaneously, a second autonomous agent can analyze Internet-based services such as social services 181. The two agents can operate in conjunction with one another. For example, the second autonomous agent can schedule appointments or gather photos from the user's social media account.

Data aggregator 150 aggregates events from the first agent and second agent. Each autonomous agent can access the aggregated data and provide the data to the respective machine learning model. Based on the data, a machine learning model can determine patterns or determine or execute rules. For example, the data aggregator 150 can aggregate and organize events that enable a machine learning model to predict when a user will wake up or go to sleep. Subsequently, an autonomous agent can take action based on the rules, such as by turning the lights on, the heat up, or the coffee maker on.

Rules can be used to adjust predicted actions. An example rule ensures that a determined action does not interfere with the user's sleep. For example, by accessing sensor data the first autonomous agent can determine that the user is asleep. Based on a rule not to disturb the user when he or she is asleep, the first autonomous agent can delay a presentation of photos received via social media until such time that the user is awake.

Reasoning module 220 analyzes data and determines actions, optionally in conjunction with machine learning model 210. For example, reasoning module 220 receives correlated event data from data aggregator 150 and takes decisions thereon. Reasoning module 220 includes an inference engine that performs the data analysis or provides the data to machine learning model 210 for analysis. Machine learning model 210 receives data from reasoning module 220, predicts data patterns or events and provides the predictions to reasoning module 220. Reasoning module 220 can include predefined or dynamic rules. Rules specify that when a specific event occurs, take a specific action in response.

Machine learning model 210 learns different data patterns. For example, sensors 170 can be used to determine when a user is waking up, going to bed, or getting ready to leave the home. Similarly, machine learning model can use socialization patterns to determine the kind of interactions that the user has on a daily basis. For example, by analyzing Internet-based services 180 such as email, or text messages, the autonomous agent 201 can determine how often the user is socializing and with whom. Such analysis is useful to prevent loneliness, i.e., ensuring that the user is social enough, or to prevent fraud by detecting scam messages or visits. As discussed further with respect to FIG. 5, different types of learning are possible. Actuator module 230 receives determined actions from reasoning module 220 and causes the integrated assistance computing system 101 to take the action. Actions can include issuing an alert, send an email, turn on the lights, etc. For example, if the light sensor 172 detects light, then the reasoning module determines a significance of the event and determines that a greeting is appropriate. The actuator module 230 outputs a greeting via speaker 103. Actuator module 230 can issue alerts. For example, by alerting the user to take medicine or of an upcoming appointment, update an investment plan, indicate potential fraud, email an invitation, notify a care-giver or notify medical personnel.

Figure 3:
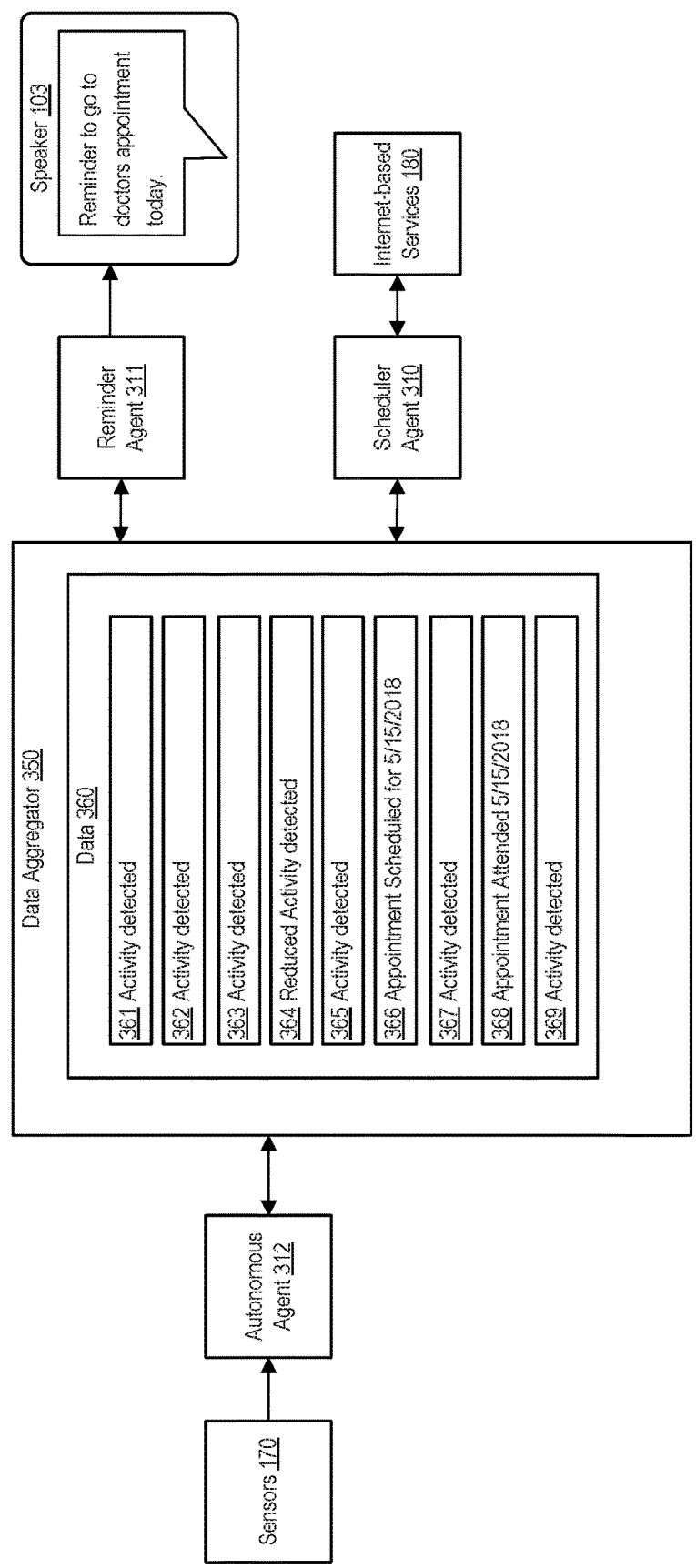
FIG. 3 depicts an example of a data aggregator for an integrated assistance computing system, according to aspects of the present disclosure.

FIG. 3 depicts an example of a data integration platform for an integrated assistance computing system, according to aspects of the present disclosure. FIG. 3 depicts an exemplary integrated assistance computing system 300. Integrated assistance computing system 300 includes one or more of data aggregator 350, sensors 170, autonomous agent 312, reminder agent 311, scheduler agent 310, Internet-based services 180, and speaker 103. While as depicted, integrated assistance computing system 300 includes three autonomous agents, different numbers are possible.

Data aggregator 350 includes data 360, which stores events 361-369. Data 360 is common storage accessible to multiple autonomous agents. In this manner, data aggregator 350 enables interaction and cooperation between the agents, including using data shared from external sources such as Internet-based services 180. Examples of data that can be stored by data aggregator 350 include public information such as addresses and phone numbers, news data, public records, private information such as pictures or social media posts, and learned rules, models, or algorithms.

Data aggregator 350 can determine similarities or correlations between data received from autonomous agents. Data aggregator 350 receives events 361-369 from one or more autonomous agents, aggregates and correlates the events into groups, and provides the groups to scheduler agent 310, reminder agent 311, and autonomous agent 312.

Events 361-369 represent events captured by one or more autonomous agents. For example, events 361, 363 and 364 could be obtained from autonomous agent 312, whereas the other events are obtained from another autonomous agent. In an example, autonomous agent 312 can access sensors 170 and receive a detection by light sensor 172 that a light was turned on. Similarly, autonomous agent 312 can access sound sensor 173 and receive a detection of noise. Other events can include social media posts, emails, or notifications. In the aggregate, events can determine a pattern of activity such as when the user wakes up, what the user typically does during the day (or a particular day of the week), and when the user typically goes to bed.

Events 361-369 are ordered chronologically but need not be. For example, events can be reordered and grouped according to other criteria such as an identified connection with a person, place, or keyword.

As depicted, event 364 is a detection of reduced activity. Reduced activity can be determined based on a deviation from normal such as a reduction in movement. In response, scheduler agent 310 schedules an appointment as indicated by event 366. To do so, scheduler agent 310 accesses Internet-based services 180, for example a healthcare provider website. Once the appointment is scheduled, scheduled agent 310 stores the appointment info in data 360 so that other autonomous agents may use the information to make further predictions. At an appropriate time, reminder agent 311 sends a reminder about the appointment to the user, for example, via text-to-speech via speaker 103.

Figure 4:
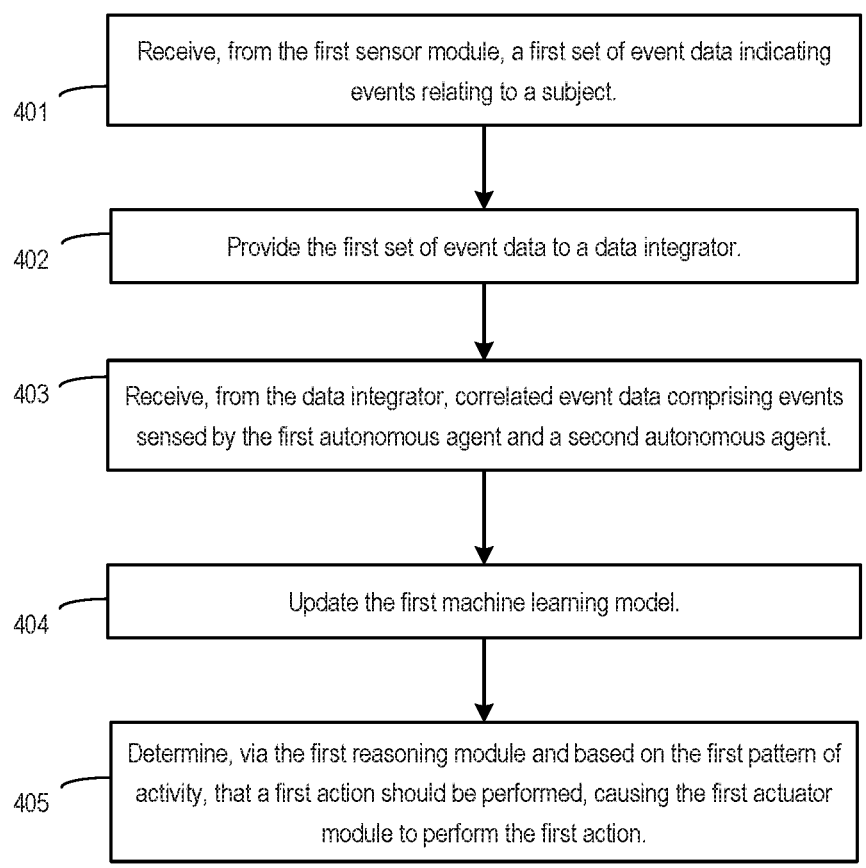
FIG. 4 depicts a flowchart of an exemplary method used to operate an integrated assistance computing system, according to certain aspects of the present disclosure.

FIG. 4 depicts a flowchart of an exemplary method 400 used to operate an integrated assistance computing system, according to certain aspects of the present disclosure. FIG. 4 is discussed with respect to FIGS. 2 and 3 for example purposes, but method 400 can be implemented on other systems.

At block 401, process 400 involves receiving, from the first sensor module, a first set of event data indicating events relating to a subject. For example, autonomous agent 312 receives events 361-355, 357, and 359 from sensors 170. Similarly, scheduler agent 310 receives events 366 and 368, representing the appointment, from Internet-based services 180.

At block 402, process 400 involves providing the first set of event data to a data aggregator. For example, autonomous agent 312 provides events 361-355, 357, and 359 to data aggregator 350, which stores the events in data 360. Scheduler agent 310 provides events 366 and 368 to data aggregator 350, which stores the events in data 360.

At block 403, process 400 involves receiving, from the data aggregator, correlated event data comprising events sensed by the first autonomous agent and a second autonomous agent. Continuing the example, reminder agent 311 receives event 366 from data aggregator 350. For example purposes, reminder agent 311 is shown as a different agent than autonomous agent 312, but autonomous agents can provide data to data aggregator 350 and receive data from data aggregator 350.

At block 404, process 400 involves updating the first machine learning model. For example, scheduler agent 310 receives events 361-355, 357, and 359 and provides the received events to a machine learning model.

At block 405, process 400 involves determining, via the first reasoning module and based on the first pattern of activity, that a first action should be performed, causing the first actuator module to perform the first action. From machine learning model, scheduler agent 310 determines that an appropriate course of action is to schedule a doctor appointment. Scheduler agent 310 connects to Internet-based services 180 and schedules the appointment. At a later time, a and reminder agent 311 provides a reminder via speaker 103 to schedule a visit.

Continuing the example, subsequent to the doctor appointment, indicated by event 368, the autonomous agents continue to monitor the user's activity. Responsive to determining the user's behavior has reverted back to normal, i.e., consistent with a pattern of events illustrated by events 361-363, an autonomous agent can determine that scheduling the doctor appointment was a valid decision. In this regard, the machine learning model receives a reward indicting that the decision taken was correct. Conversely, if the activity detected 369 indicates continued unusual activity, then the autonomous agent determines a different course of action and provides the machine learning model an indication of a low reward. In either case, the machine learning model can adjust internal parameters such as states or modify previously established rules in order to encourage (for positive feedback) or discourage (for negative feedback) the performed action. In this manner, the autonomous agents learn and improve.

Figure 5:
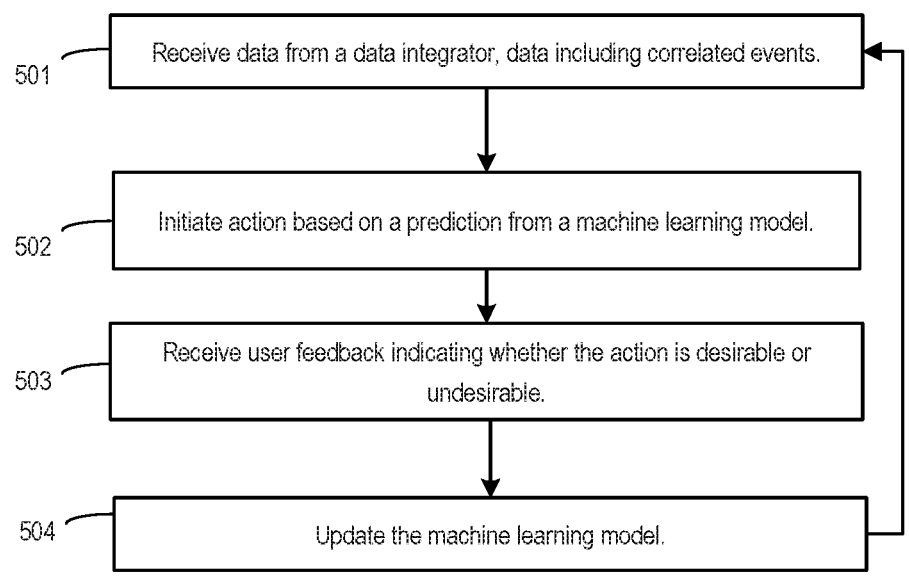
FIG. 5 depicts a flowchart of an exemplary method used for reinforcement learning, according to certain aspects of the present disclosure.

FIG. 5 depicts a flowchart of an exemplary method 500 used for reinforcement learning, according to certain aspects of the present disclosure. Method 500 can be implemented by integrated assistance computing device or by another device. Machine learning models described herein can base predictions on data aggregated from one or more autonomous agents, one or more sensors 170, one or more physical devices 160, or one or more Internet-based services 180. With reinforcement learning, the machine learning model is continuously updated based on feedback received from a user or operator. Feedback can be provided via a user interface, or via text-to-speech, or by another means.

At block 501, process 500 involves receiving, from a data aggregator, data including correlated events. The data can include events that originated from different autonomous agents, such as reminder agent 111 or responder agent 112. As shown in FIG. 3, data aggregator 350 determines that two or more events are related, groups the events, and make the correlated events available to the autonomous agents.

At block 502, process 500 involves initiating an action based on a prediction from a machine learning model. In an example, integrated assistance computing system 101 schedules an appointment for the user such as a doctor's appointment.

At block 503, process 500 involves receiving user feedback indicating whether the action is desirable or undesirable. Feedback can be provided in different manners. For example, feedback can be user-based, e.g. via a user interface or voice command. Integrated assistance computing system 101 can receives feedback from a user indicating whether the user considers the scheduled appointment to be useful. Feedback can be inferred from a detection that an unusual pattern of activity is continuing. For example, if an unusual pattern of activity (e.g., shown by event 364) does not improve, then a low reward or negative feedback is inferred. Integrated assistance computing system 101 provides the feedback to the machine learning model.

At block 504, process 500 involves updating internal parameters of the machine learning model. The parameters are updated as to maximize the reward. More specifically, the machine learning model associates attributes or parameters of the scheduled event with the user's feedback such that the event is more likely to be generated if the event received positive feedback, and less likely to be generated if the event received negative feedback. In this manner, the machine learning model maximizes the reward and improves over iterations.

Machine learning models described herein can also use supervised or unsupervised learning. Using supervised learning, a set of training data with known positive and negative cases is provided to the machine learning model 210 in order to train the model to make predictions. Training can be performed before the integrated assistance computing system is provided to a user, for example, at the factory. In an example, supervised learning can be used to train the machine learning model 210 to predict when a user will wake up by providing patterns that include the identification of sound, light, or movement. Using unsupervised learning, machine learning model 210 learns and adapts over time. In this case, training is performed with live user data, for example, when the user interacts with the device.

Figure 6:
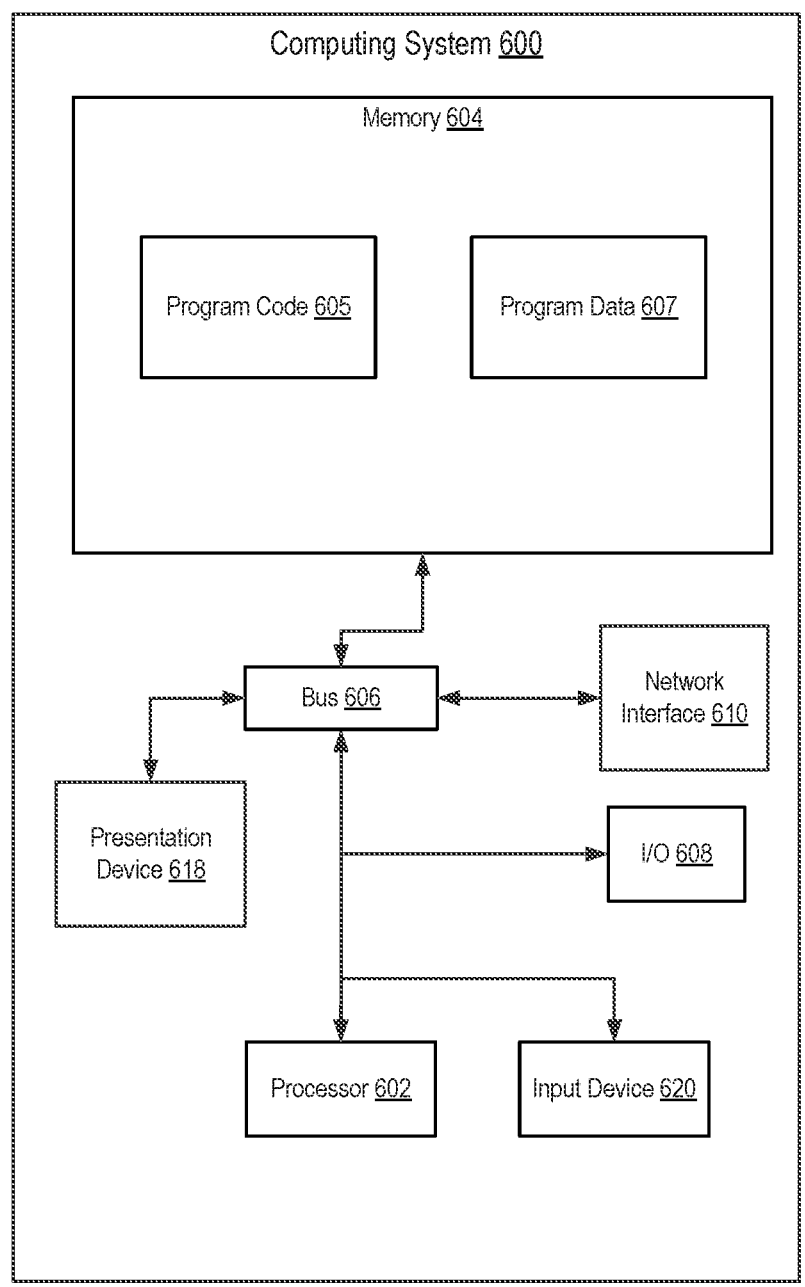
FIG. 6 depicts an example of a computing system for implementing an integrated assistance computing system, according to certain aspects of the present disclosure.

FIG. 6 depicts an example of a computing system 600 for implementing an integrated assistance computing system, according to certain aspects of the present disclosure. The implementation of computing system 600 could be used for one or more of scheduler agent 110, reminder agent 111, responder agent 112, another autonomous agent, system integrator 140, or data aggregator 150.

The depicted example of a computing system 600 includes a processor 602 communicatively coupled to one or more memory devices 604. The processor 602 executes computer-executable program code stored in a memory device 604, accesses information stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices, including a single processing device.

A memory device 604 includes any suitable non-transitory computer-readable medium for storing program code 605, program data 607, or both. Program code 605 and program data 607 can be from scheduler agent 110, reminder agent 111, responder agent 112, another autonomous agent, system integrator 140, or data aggregator 150, or any other applications or data described herein. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 600 may also include a number of external or internal devices, an input device 620, a presentation device 618, or other input or output devices. For example, the computing system 600 is shown with one or more input/output ("I/O") interfaces 608. An I/O interface 608 can receive input from input devices or provide output to output devices. One or more buses 606 are also included in the computing system 600. The bus 606 communicatively couples one or more components of a respective one of the computing system 600.

The computing system 600 executes program code 605 that configures the processor 602 to perform one or more of the operations described herein. Examples of the program code 605 include, in various aspects, modeling algorithms code executed by scheduler agent 110, reminder agent 111, responder agent 112, another autonomous agent, system integrator 140, or data aggregator 150, or other suitable applications that perform one or more operations described herein. The program code may be resident in the memory device 604 or any suitable computer-readable medium and may be executed by the processor 602 or any other suitable processor.

In some aspects, one or more memory devices 604 stores program data 607 that includes one or more datasets and models described herein. Examples of these datasets include interaction data, environment metrics, training interaction data or historical interaction data, transition importance data, etc. In some aspects, one or more of data sets, models, and functions are stored in the same memory device (e.g., one of the memory devices 604). In additional or alternative aspects, one or more of the programs, data sets, models, and functions described herein are stored in different memory devices 604 accessible via a data network.

In some aspects, the computing system 600 also includes a network interface device 610. The network interface device 610 includes any device or group of devices suitable for establishing a wired or wireless data connection to one or more data networks. Non-limiting examples of the network interface device 610 include an Ethernet network adapter, a modem, and/or the like. The computing system 600 is able to communicate with one or more other computing devices via a data network using the network interface device 610.

In some aspects, the computing system 600 also includes the input device 620 and the presentation device 618 depicted in FIG. 6. An input device 620 can include any device or group of devices suitable for receiving visual, auditory, or other suitable input that controls or affects the operations of the processor 602. Non-limiting examples of the input device 620 include a touchscreen, a mouse, a keyboard, a microphone, a separate mobile computing device, etc. A presentation device 618 can include any device or group of devices suitable for providing visual, auditory, or other suitable sensory output. Non-limiting examples of the presentation device 618 include a touchscreen, a monitor, a speaker, a separate mobile computing device, etc. Presentation device 618 can implement functionality of display 104. In addition, presentation device 618 can display user interface elements, such as sliders or controls.

Although FIG. 6 depicts the input device 620 and the presentation device 618 as being local to the computing device that executes scheduler agent 110, reminder agent 111, responder agent 112, another autonomous agent, system integrator 140, or data aggregator 150, other implementations are possible. For instance, in some aspects, one or more of the input device 620 and the presentation device 618 can include a remote client-computing device that communicates with the computing system 600 via the network interface device 610 using one or more data networks described herein.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A system comprising:
a first autonomous agent comprising a first sensor module, a first reasoning module, and a first actuator module, wherein the first sensor module manages a first sensor and the first reasoning module provides a first machine learning model, wherein the first autonomous agent is configured to:
receive, from the first sensor module, a first set of event data indicating events relating to a subject,
provide the first set of event data to a data aggregator,
receive, from the data aggregator, correlated event data comprising the first set of event data correlated with a second set of event data having been provided to the data aggregator by a second autonomous agent,
update the first machine learning model by:
applying the first machine learning model to the correlated event data to predict a first pattern of activity,
determining a first reward of the first machine learning model, and
updating internal parameters of the first machine learning model to maximize the first reward; and
determining, via the first reasoning module and based on the first pattern of activity, that a first action should be performed, causing the first actuator module to perform the first action; wherein
the second autonomous agent comprises a second sensor module, a second reasoning module, and a second actuator module, wherein the second sensor module manages a second sensor and the second reasoning module provides a second machine learning model, wherein the second sensor is different from the first sensor and the second autonomous agent is configured to:
receive, from the second sensor module, the second set of event data indicating events relating to the subject,
provide the second set of event data to the data aggregator,
receive, from the data aggregator, the correlated event data,
update the second machine learning model by:
applying the second machine learning model to the correlated event data to predict a second pattern of activity,
determining a second reward of the second machine learning model, and
updating internal parameters of the second machine learning model to maximize the second reward, and
determine, via the second reasoning module and based on the second pattern of activity, that a second action should be performed, causing the second actuator module to perform the second action; and
the data aggregator comprises a data store and is configured to:
store the first set of event data and the second set of event data in the data store;
correlate a plurality of events from the first set of event data and the second set of event data; and
store the correlated event data in the data store.

2. The system of claim 1, wherein the first reward comprises maximizing positive feedback, and wherein the first autonomous agent is further configured to receive feedback based on the first action, wherein the feedback is positive or negative.

3. The system of claim 1, wherein the first autonomous agent is further configured to receive an event from an internet-based service and the first action comprises causing the internet-based service to perform an action comprising (i) sending a message or (ii) updating a status on a social media website.

4. The system of claim 1, wherein the data aggregator is further configured to:
provide the first set of event data and the second set of event data to a machine learning model;
receive, from the machine learning model, a grouping of events, the events comprising a first event from the first set of event data and a second event from the second set of event data; and
provide the grouping of events to the first autonomous agent and the second autonomous agent as the correlated event data.

5. The system of claim 1, wherein the first autonomous agent is further configured to:
receive a voice command comprising instructions;
provide the voice command to the first machine learning model;
identify, using the first machine learning model, an additional action; and
cause the first actuator module to perform the additional action.

6. The system of claim 1, wherein the first autonomous agent is further configured to: receive, from the first machine learning model, an additional action to be performed; and
cause an alert to be provided to a user, wherein the alert is delivered via (i) a sound, (ii) a light, or (iii) a display.

7. The system of claim 1, wherein the first action comprises scheduling an appointment with (i) a medical professional, (ii) a financial professional, or (iii) a family member.

8. The system of claim 1, wherein the first sensor module is one of (i) a light sensor, (ii) a motion sensor, (iii), a sound sensor, or (iv) a temperature sensor.

9. The system of claim 1, wherein the first action comprises an adjustment of a parameter of (i) a wheelchair, (ii) a doorbell, (iii) an appliance, or (iv) a light.

10. A method comprising:
receiving at a first autonomous agent, from a first sensor module, a first set of event data indicating events relating to a subject;
providing the first set of event data to a data aggregator,
receiving, from the data aggregator, correlated event data comprising the first set of event data correlated with a second set of event data having been provided to the data aggregator by a second autonomous agent; and
updating a first machine learning model by:
applying the first machine learning model to the correlated event data to predict a first pattern of activity,
determining a first reward of the first machine learning model, and
updating internal parameters of the first machine learning model to maximize the first reward;
determining, based on the first pattern of activity, that a first action is to be performed;

causing the first action to be performed;
receiving at the second autonomous agent, on a second sensor module, the second set of event data indicating events relating to the subject;
providing the second set of event data to the data aggregator;
receiving, from the data aggregator, the correlated event data;
updating a second machine learning model by:
applying the second machine learning model to the correlated event data to predict a second pattern of activity,
determining a second reward of the second machine learning model, and
updating internal parameters of the second machine learning model to maximize the second reward; and
determining, based on the second pattern of activity, that a second action is to be performed, causing the second action to be performed.

11. The method of claim 10, wherein the first reward comprises maximizing positive feedback, the method further comprising:
receiving feedback based on the first action, wherein the feedback is positive or negative; and
updating internal parameters of the first machine learning model such that the first reward is maximized.

12. The method of claim 10, wherein the first autonomous agent is further configured to receive an event from an internet-based service and the first action comprises causing the internet-based service to perform an action comprising (i) sending a message or (ii) updating a status on a social media website.

13. The method of claim 10, further comprising:
providing the first set of event data and the second set of event data to a machine learning model;
receiving, from the machine learning model, a grouping of events, the events comprising a first event from the first set of event data and a second event from the second set of event data; and
providing the grouping to the first autonomous agent and the second autonomous agent as the correlated event data.

14. The method of claim 10, further comprising:
receiving a voice command comprising instructions;
providing the voice command to the first machine learning model;
identifying, using the first machine learning model, an additional action; and
causing the first action to be performed.

15. The method of claim 10, further comprising:
receiving, from the first machine learning model, an additional action to be performed; and
causing an alert to be provided to a user, wherein the alert is delivered via (i) a sound, (ii) a light, or (iii) a display.

16. The method of claim 10, wherein the first autonomous agent comprises a scheduling agent, wherein the first action comprises scheduling an appointment with (i) a medical professional, (ii) a financial professional, or (iii) a family member and wherein the second autonomous agent comprises a responder agent adapted to interact with a user.

17. The method of claim 10, wherein the first sensor module is one of (i) a light sensor, (ii) a motion sensor, (iii), a sound sensor, or (iv) a temperature sensor.

18. The method of claim 10, wherein the first action comprises an adjustment of a parameter of (i) a wheelchair, (ii) a doorbell, (iii) an appliance, or (iv) a light.

19. A method of operating an autonomous agent, comprising:
accessing, from a data aggregator, a set of training data comprising a set of training instances, wherein each training instance comprises a first event relating to a subject gathered from a first sensor of the autonomous agent, a second event relating to the subject gathered from a second sensor of a second autonomous agent, and an expected correlation of the first event and the second event provided by the data aggregator; and
training a machine learning model by iteratively:
providing one of the training instances to the machine learning model,
receiving, from the machine learning model, a predicted correlation;
calculating a loss function by calculating a difference between the predicted correlation and the expected correlation; and
adjusting internal parameters of the machine learning model to minimize the loss function;
receiving, from the first sensor, a first set of event data;
providing the first set of event data to the data aggregator;
receiving, from the data aggregator, correlated event data comprising events sensed by the first sensor and the second sensor;
receiving, from the machine learning model, a prediction; and
causing the autonomous agent to perform an action based on the prediction.

20. The method of claim 19, wherein the data aggregator correlates a plurality of events from the first set of event data and a second set of event data from the second autonomous agent.

* * * * *